United States Patent
Klein

(10) Patent No.: US 8,500,190 B1
(45) Date of Patent: Aug. 6, 2013

(54) TRAILER ASSEMBLY ROOF BOW

(71) Applicant: FCS Industries, Inc., Taylor, MI (US)

(72) Inventor: Richard Klein, Ann Arbor, MI (US)

(73) Assignee: FCS Industries, Inc., Taylor, MI (US)

( * ) Notice: Subject to any disclaimer, the term of this patent is extended or adjusted under 35 U.S.C. 154(b) by 0 days.

(21) Appl. No.: 13/630,707

(22) Filed: Sep. 28, 2012

(51) Int. Cl.
*B62D 25/06* (2006.01)

(52) U.S. Cl.
USPC .................. 296/185.1; 296/210; 296/104

(58) Field of Classification Search
USPC ........................ 296/185.1, 210, 104
See application file for complete search history.

(56) References Cited

U.S. PATENT DOCUMENTS

| | | | |
|---|---|---|---|
| 2,921,814 | A | 11/1959 | Witt et al. |
| 2,966,436 | A | 12/1960 | Fox et al. |
| 3,061,364 | A | 10/1962 | Tantlinger et al. |
| 3,334,007 | A | 8/1967 | Flagan |
| 3,429,083 | A | 2/1969 | Voros |
| 3,962,015 | A | 6/1976 | Heimann |
| 4,214,789 | A | 7/1980 | Katz et al. |
| 4,422,558 | A | 12/1983 | Mittelmann et al. |
| 4,652,042 | A | 3/1987 | Bader |
| 5,492,747 | A | 2/1996 | Kemp et al. |
| 5,664,826 | A | 9/1997 | Wilkens |
| 5,702,151 | A | 12/1997 | Grote et al. |
| 5,988,074 | A | 11/1999 | Thoman |
| 6,793,271 | B1 | 9/2004 | Deets |
| 6,802,521 | B1 | 10/2004 | Boughton |
| 6,893,075 | B2 | 5/2005 | Fenton et al. |
| 7,210,727 | B2 | 5/2007 | Stephenson et al. |
| 7,296,704 | B2 | 11/2007 | Ferrini |
| 7,478,865 | B2 | 1/2009 | Klein |
| 7,926,866 | B2 | 4/2011 | Schmidt et al. |
| 2006/0045682 | A1 | 3/2006 | Norris, Jr. |
| 2007/0132281 | A1 | 6/2007 | Ehrlich |
| 2008/0023988 | A1 | 1/2008 | Ochoa |

FOREIGN PATENT DOCUMENTS

GB   2 028 960 A   3/1980

OTHER PUBLICATIONS

CargoSport—Pro-Line Performance, Pro-Line Trailer Sales, Pro-Line Car, Motorcycle, Utility Race Car, p. 1, Feb. 25, 2008.

*Primary Examiner* — Joseph Pape
*Assistant Examiner* — Dana Ivey
(74) *Attorney, Agent, or Firm* — Brinks Hofer Gilson & Lione

(57) ABSTRACT

A roof bow for a trailer body for use with a commercial motor vehicle is provided, including a top wall, a floor, and a pair of side walls cooperating to define a cargo space, and a plurality of supports each extending substantially across the trailer body between the side walls. The top wall includes an interior surface and an exterior surface, and the supports are connected to the exterior surface of the top wall such that at least a substantial portion of the interior surface of the top wall is generally smooth. The roof bow has a uniform cross-sectional shape along its length and having a crown joining with side walls and a pair of attachment pads, the bow forming an interior cavity with the pads having inwardly extending leg extensions.

9 Claims, 4 Drawing Sheets

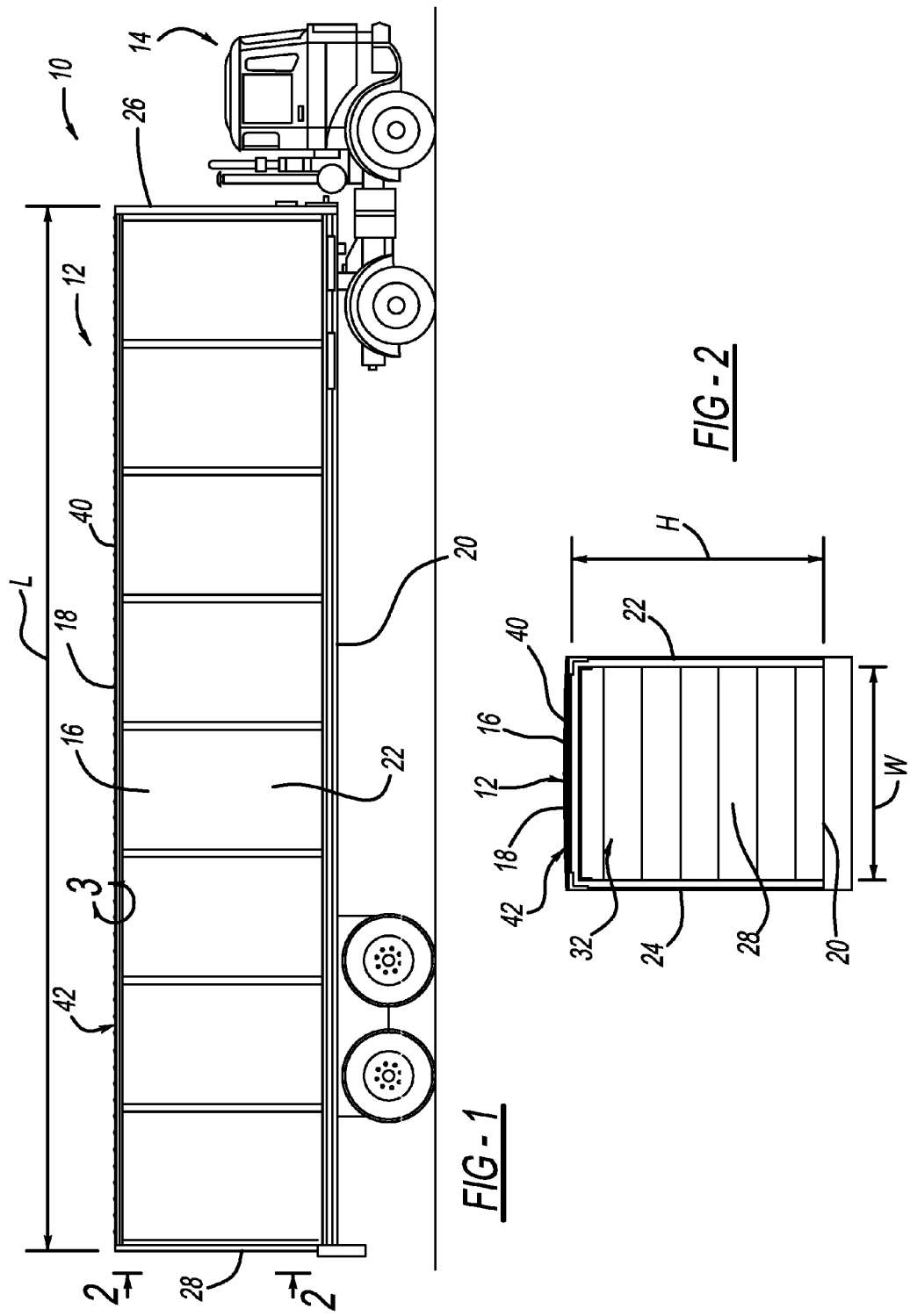

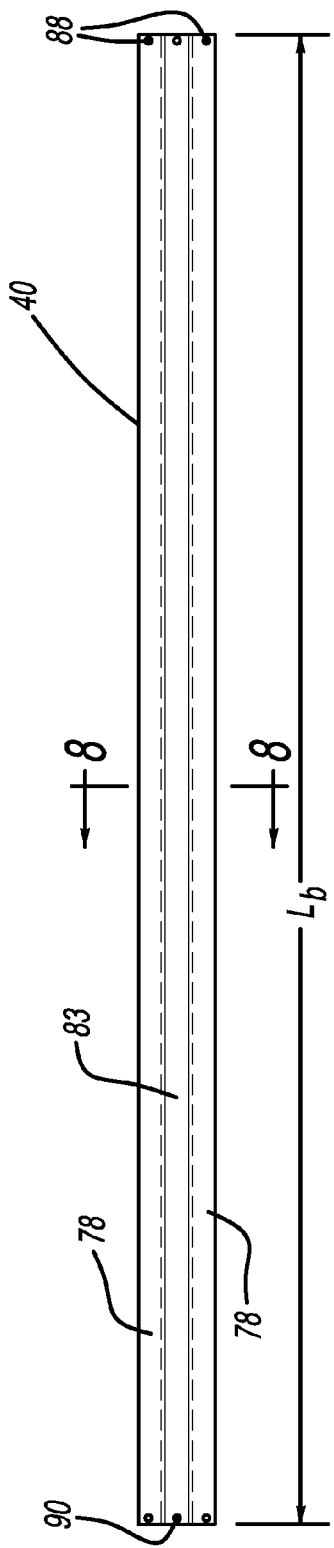
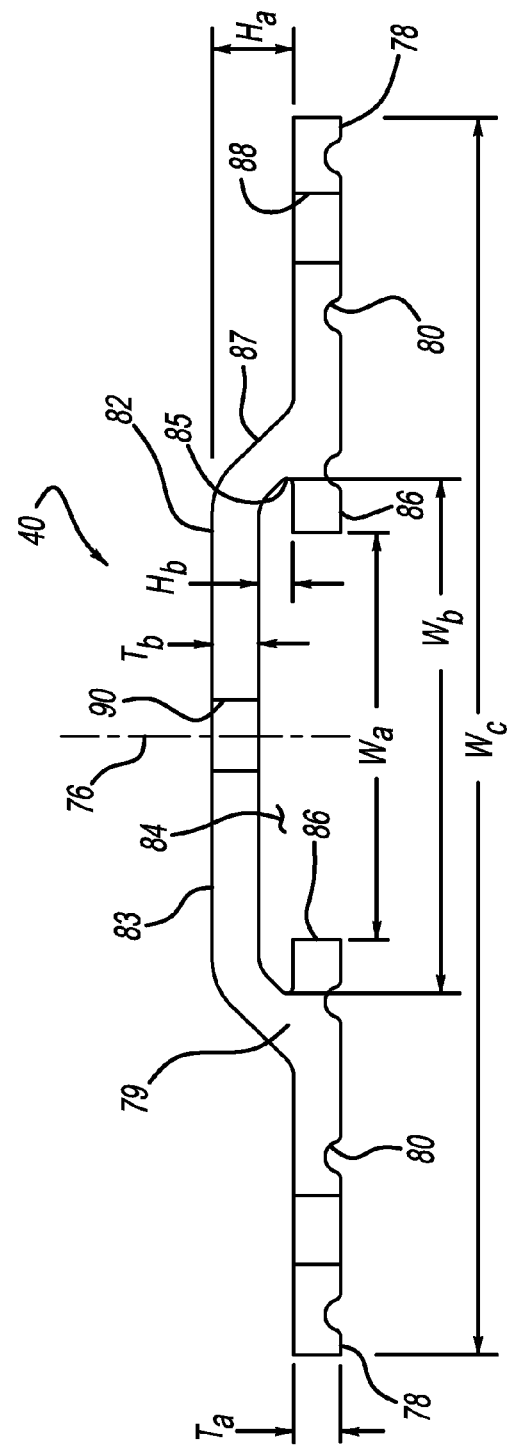
FIG-7
FIG-8

TRAILER ASSEMBLY ROOF BOW

FIELD OF THE INVENTION

This invention relates to a trailer assembly, and particularly to a roof bow for a trailer for commercial trucking applications.

BACKGROUND OF THE INVENTION

Commercial trucking provides a substantial proportion of commercial transportation of goods throughout the world. One common type of commercial truck is a tractor-trailer, which includes a semi-trailer coupled with a road tractor. The term "semi-trailer" typically refers to a trailer having one or more rear axles and no front axles. During operation, a large proportion of the weight of the semi-trailer is supported either by the road tractor or by a detachable front axle assembly known as a dolly. Semi-trailers are also normally equipped with legs that can be lowered to support the semi-trailer when it is uncoupled from the dolly or the road tractor.

As used herein, the term, "commercial motor vehicle" refers to any self-propelled or towed motor vehicle for use on a highway in interstate commerce to transport passengers or property and having a gross vehicle weight rating of 4,536 kilograms (approximately 10,000 pounds) or more. As used herein, the term, "gross vehicle weight rating" is the maximum allowable weight of a fully equipped tow vehicle including passengers and cargo. As used herein, the term, "Class A commercial motor vehicle" refers to any commercial vehicle having a gross vehicle weight rating ("GVWR") of at least 11,793 kilograms (approximately 26,000 pounds).

Currently, in the United States, semi-truck trailers are typically on the order of 40 to 53 feet long and have a rear swing-open door providing an opening of about 110 inches high and 100 inches wide. Trucking operators seek to maximize the utilization of interior space within the trailer. Forklift trucks are typically used to load cargo into trailers. Specifically, cargo is supported by a pallet, which is lifted vertically by the forklift truck and deposited in the trailer. It is common for the forklift truck or other loading machine to push cargo from the rear open door of the trailer toward the front.

The typical trailer construction utilizes a roof of sheet metal or other opaque sheet material supported by a number of transversely extending reinforcing ribs or bows. These bows are exposed to the inside of the trailer and form irregularities on the inside surface of the trailer roof. During the loading process, it is unfortunately common for cargo or the cargo loading system to come in contact with one of the bows, potentially causing damage to the roof structure. Due to fear of damaging trailers in this manner, operators are often not able to fully utilize the interior capacity of the trailer. Damage to internal exposed roof bows during the cargo loading and unloading process imposes a significant operating cost burden on motor carrier operators and can cause shipping delays.

Furthermore, the opaque nature of currently-known trailer roofs causes the cargo space within the trailer to be generally void of natural light. Therefore, artificial light typically must be provided during loading and unloading of the cargo space.

A recent improvement in trailer construction is the development of trailer roofs with external bows. Such a design is described by U.S. Pat. No. 7,478,865. A trailer having a roof assembly constructed in accordance with that patent features a smooth inside roof surface. This is achieved by using transversely extending reinforcing bows which are mounted on the exterior or upper surface of the roof. The bow preferably have an inverted "U" or "W" shaped cross sectional configuration with flanges which engage the upper surface of the roof panel. External bows are used to support the roof panel using adhesives. This construction provides a smooth interior surface in the trailer which substantially reduces the likelihood of objects, containers, or machines becoming snagged on the roof bows.

For such trailers, a preferred material for the roof panel is a translucent composite material such as a fiberglass or other polymer material. By utilizing a translucent material, ambient light can reach the inside of the trailer which is convenient for trailer loading and unloading operations.

In order to provide a seamless roof panel structure to prevent water leakage, it is preferred that the external transversely extending roof bows are bonded to the roof using adhesive materials or tapes. In the production process, it is preferred that the roof panel is held in position to the side, front, and rear panels of the trailer through the use of frame rails which sandwich the roof panel between the frame rail and the existing perimeter structural members of the trailer. Rivets or other mechanical fasteners can be used to support the perimeter of the roof panel. Thereafter, the externally mounted roof rails are mounted on top of the roof panel with its ends riveted or otherwise mechanically attached to the side rail structure.

Assembly of the roof of the above-described design is achieved using a fixture which supports the roof panel in a convex crowned shape, enabling the external roof bows to be bonded to the roof panel.

The design provided by the previously mentioned issued patent provides outstanding performance benefits and that design is being widely adopted. However, there is a continuing need to improve the design of these systems. In particular, the external bows of the previously mentioned patent are formed from sheet metal stock. Although forming sheet metal is generally an inexpensive fabrication process, formed sheet metal bows may not provide an ideal surface for providing bonding agents for attachment of the roof panel to the bows. Moreover, the manufacturing process of forming sheet metal into the bows limits the freedom of design of the bow configuration. In particular, in cross-section, a sheet metal formed bow has a generally uniform material thickness and the degrees of bending and other forming limitations are present.

In accordance with the present invention, an improved roof bow is provided for external bow semi-trailer applications.

BRIEF DESCRIPTION OF THE DRAWINGS

FIG. 1 is a tractor-trailer embodying the principles of the present invention;

FIG. 2 is a rear view of a body portion of the trailer taken from the perspective generally indicated by arrow 2 in FIG. 1;

FIG. 7 is a plan view of a trailer roof bow in accordance with this invention; and FIG. 8 is a cross-sectional view through a trailer roof bow in accordance with this invention taken along line 8-8 of FIG. 7.

DETAILED DESCRIPTION OF THE INVENTION

Figure 3:
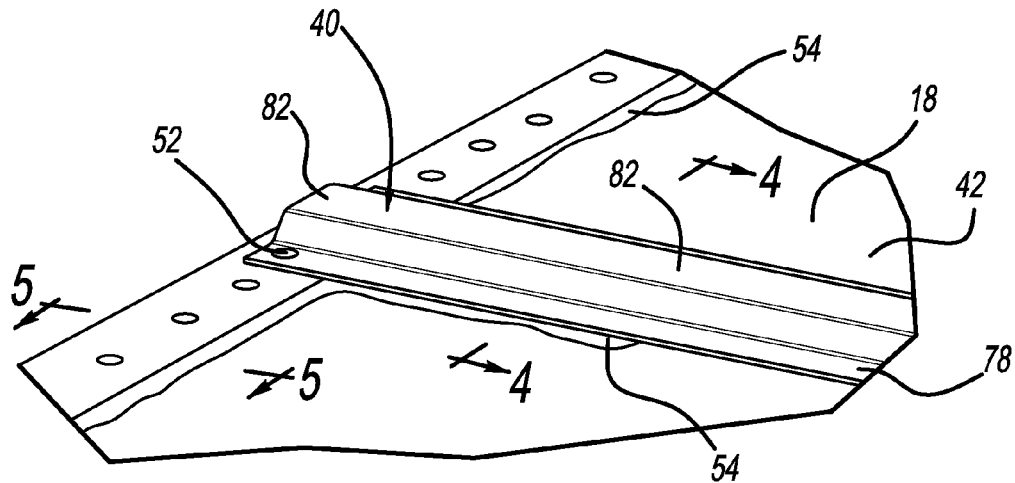
FIG. 3 is an enlarged isometric view of the portion of the trailer defined by line 3 in FIG. 1.

Referring now to FIG. 1 a tractor-trailer 10 is shown having a trailer 12 for storing and transporting objects and semi-truck tractor 14, for towing the trailer. The tractor-trailer 10 is particularly suited for commercial transportation of goods.

As shown in FIGS. 1 and 2, the trailer 12 includes a trailer body 16 having a roof panel 18, a floor 20, a pair of side walls 22 and 24, a front wall 26, and a rear door 28 cooperating to define a cargo space 30 (FIG. 5) for storing cargo. When the rear door 28 is in an open position, the trailer body 16 generally defines a loading opening 32 having a height H of about 111.5 inches (for example) and a width W of about 100 inches (for example). Additionally, the trailer body 16 has a length L of about 40 to 53 feet (for example). The floor 20 and the side walls 22 and 24 are preferably made of sheet metal or other sheet materials, and the floor 20 preferably includes support struts or another suitable support structure. The roof panel 18 is preferably made of a translucent or transparent material so that ambient light is able to enter the cargo space 30 and improve the visibility within the trailer 12.

The trailer body 16 includes a plurality of transversely extending roof bows 40 that are mounted to the top surface of the roof panel 18 at various points along the length L of the trailer body 12. More specifically, the bows 40 each extend across the width W of the roof panel 18 to provide structural support. The bows 40 each have a generally bowed shape so that the midpoint of each bow 40, which is positioned near the lateral midpoint of the trailer body width W, is slightly higher than the endpoints of each bow 40, which are positioned near the side walls 22 and 24. The bowed shape of bows 40 adds structural support to the trailer and reduces the amount of moisture and dirt that collect on the roof 18.

Figure 4:
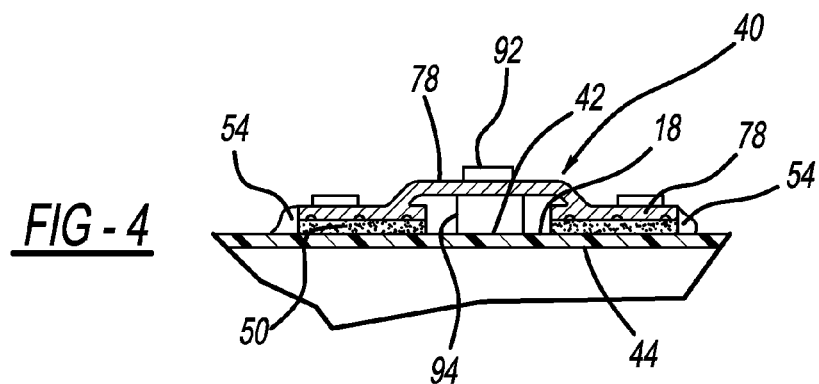
FIG. 4 is a cross-sectional view of the trailer taken along line 4-4 in FIG. 3.

As best shown by FIGS. 3 and 4, the bows 40 are each connected to an external surface 42 of the roof panel 18 so that an interior surface 44 (FIG. 4) of the roof panel is generally smooth. The generally smooth interior surface 44 of the roof panel 18 reduces the likelihood that the roof panel 18 will be damaged during loading and unloading of cargo into and from the cargo space 30. Additionally, the generally smooth interior surface 44 of the roof panel 18 maximizes an effective volume of the cargo space 30 by permitting cargo containers to be positioned close to the interior surface 44 without contacting the roof panel.

As shown in FIGS. 3, 4, 8 and 9, the bows 40 each define a U-shaped rib or crown 82 positioned adjacent a pair of securing flanges or pads 78 for connecting the bows 40 to the roof panel 18. The bows 40 are preferably single, unitary components to maximize strength and the part life and are preferably formed of a material having suitable strength and unit weight, such as steel, aluminum or a composite plastic. In a preferred embodiment of this invention, the bows 40 are formed from aluminum by an extrusion process. Further details of the form and features of the bows 40 are provided later in this description.

The bows 40 are preferably secured to the external surface 42 of the roof panel 18 by adhesive beads 50 and rivets 52 fastened to upper side rails through holes 88. Additionally, a bead of a sealing agent such as caulk 54 may be used to form a generally water-tight seal between the bows 40 and the roof 18 and/or between the side walls 22 and 24, and the roof panel 18.

Figure 5:
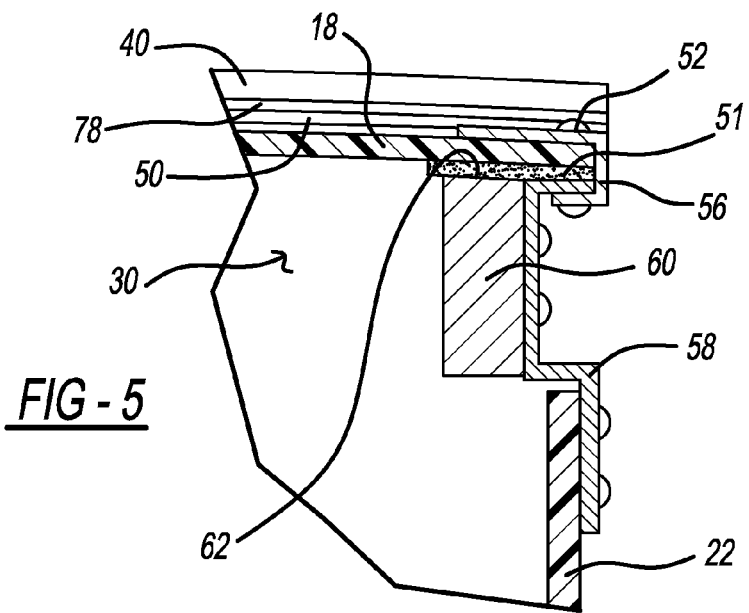
FIG. 5 is a cross-sectional view of the trailer taken along line 5-5 in FIG. 3.
Figure 6:
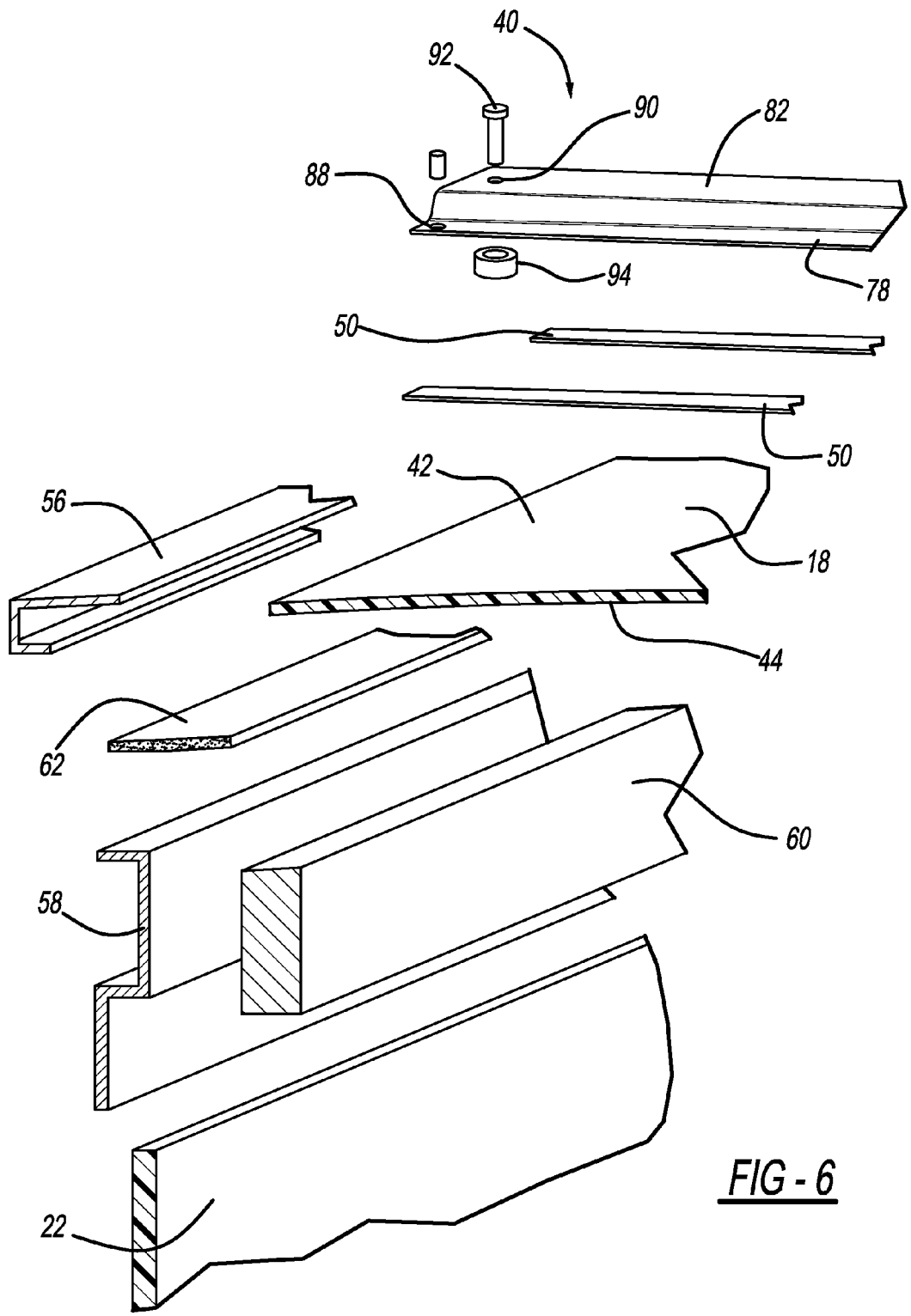
FIG. 6 is an exploded view of a the portion of the trailer shown in FIG. 5.

As shown in FIGS. 5 and 6, the side walls 22 and 24 are coupled with the roof panel 18 by brackets 56 and 58 which form upper side rails, a support beam 60, and adhesive beads 51 and rivets 52 through holes 88. More specifically, the first bracket 58 extends along the length of the side wall 22 and is riveted thereto. The second bracket 56, which also extends along the length of the side wall 22, is riveted to the first bracket 58 to form a slot for receiving the roof panel 18 and the adhesive bead 51. Furthermore, the support beam 60 is flush with a flange of the first bracket 58 to define a generally flat support surface 62 for the roof panel 18. These components form a secure and generally water-tight seal along the length of the trailer body 16.

During assembly of the trailer body 16, the roof 18 is temporarily supported by one or more temporary supports extending along the width of the trailer body 16. For example, an additional set of the bows 40 are temporarily provided on the underside of the roof 18 to support the roof 18 during assembly and to urge the roof 18 into the upwardly-bowed shape discussed above. More specifically, the temporary bows are connected to the support beams 60 so as to be generally flush with the upper wall 18 at the ends of the temporary bows. The bows may need to be shortened so as to extend along the distance between the respective support beams 60. As discussed above, the temporary bows have a midpoint that is higher than the end points, so that the central region of the roof 18 is urged upwards into an arcuate shape when the temporary bows are connected to the support beams 60. The bows 40 are then connected to the external surface 42 of the roof panel 18 using adhesive 50, thereby forming a flush and secure connection between the bows 40 and the roof panel. After the brackets 56 and 58 are secured to the side walls 22 and 24 and roof panel 18, the temporary bows are removed from the interior surface 44 of the roof 18.

Now with particular reference to FIGS. 7 and 8, details of the design of the bow 40 are illustrated in greater detail. In transverse cross-section, the bow 40 is generally symmetrical about a median vertical plane 76, and includes a pair of side attachment pads 78. The pads 78 in turn form a number of adhesive grooves 80 on their bottom surface facing the roof panel 18; three are shown for each of the pads 78. The lower surface of both pads 78 forming the adhesive grooves 80 lay on a common plane. The design the bow 40 provides a cost effective construction due to minimal adhesive requirements as a result of the adhesive grooves 80 and the provision of two contact areas provided by the two pads 78. An upwardly extending crown region 82 in the center forms an interior cavity 84. The crown 82 has a top flat region 83 and a pair of angled side walls 87 which join the pads 78 at joining areas 79. The pads 78 extend toward the center of the bow a small distance from interior cavity inside corner 85, forming interior leg extensions 86. As shown, the width $W_b$ of interior cavity 84 is greater than the separation distance or width $W_a$ between the inside edges of the leg extensions 86. Along the length of the bow 40, the pads 78 form a number of rivet holes. The crown 82 forms a rivet hole 90 which may be provided only at the end of each of the bows for providing the construction shown in FIG. 4. The edges of sections of the bow 40 join at bended radii, which reduce stresses acting the bow and provide aerodynamic smoothing. Aerodynamic smoothening is provided in particular by the blended radii of the outer surface of the junction between the crown 82 and the side walls 87 of about 0.312 inches.

FIG. 7 is a plan (overhead) view of the roof bow 40. The figure shows an exemplary length $L_b$ of about 102.43 inches before the bow 40 is deflected to the bowed configuration for its installation. When deflected, the length $L_b$ becomes about 102.37 inches.

In one preferred embodiment of the present invention the roof bow 40 has an overall width $W_c$ of about 5.0 inches, with the adhesive grooves 80 being separated by about 0.66 inch, and overall height $H_a$ of about 0.50 inch, a separation distance $H_b$ in the corner area 85 of about 0.125 inch, and a separation width $W_a$ between leg extensions 86 of about 1.50 inch. In one embodiment of the present invention, the thickness $T_a$ of the pads 78 can be about 0.125 inch and the material forming crown 82 can have a thickness $T_b$ of 0.19 inch.

The configuration of the bow 40 provides a number of significant benefits over the formed sheet metal type bow as described in Applicants issued U.S. Pat. No. 7,478,865. The adhesive grooves 80 provide an area for the retention of adhesive material forming adhesive bead 50 and provides more surface area for adhesion. When the bow 40 is pressed against roof panel 18 when using a liquid or gel adhesive, the adhesive can be pressed out of the contact area due to the pressure exerted between the two surfaces. This leaves an extremely thin layer of adhesive which may not be sufficient to adequately bond the parts together. Instead, the adhesive grooves 80 ensure that a thickness of adhesive material is retained in these channels for optimizing bonding.

When forming bows from sheet metal material as in the known art, there are limitations in the thickness of metal that can be formed in a commercially viable manner. Also, extrusion, unlike sheet metal forming processes, allows great freedom in selecting thicknesses of sections of the bow 40 to optimize structural characteristics. The cost and complexity of tooling for forming sheet metal becomes much greater as gage thickness increases. Moreover, residual stresses occur during the forming operation which can lead to cracking and corrosion problems.

The bow leg extensions 86 provide reinforcement and reduce the likelihood of cracking under loading in use which would result without the added support. The leg extensions 86 also increase the contact area between the bow and the roof panel 18, which serves to maintain the camber or arc surface of the roof without enlarging the total width $W_c$ of the bow. The leg extensions 86 also reinforce the junction area between the side walls 87 and the pads 78, by extending outwardly and inwardly from the connection area.

The provision of the fastener 92 through the crown rivet hole 90 and the use of the spacer 94 provides a rigid attachment of the bow 40 and increases the bending stiffness, strength, and stability to the bow.

It is therefore intended that the foregoing detailed description be regarded as illustrative rather than limiting, and that it be understood that it is the following claims, including all equivalents, that are intending to define the spirit and scope of this invention. More particularly, the apparatus and assembly described are merely an exemplary apparatus and assembly, and they are not intended to be limiting. Many of the steps and devices for performing the steps described above may be eliminated or replaced by alternative steps and devices.

What is claimed is:

1. A roof bow for a commercial trailer body, the roof bow adapted to extend transversely across the roof of the trailer body and to support a roof panel affixed below the roof bow comprising:

the roof bow in an elongated form having a uniform cross-sectional shape along its length, the cross-sectional shape defining a median plane aligned with the longitudinal axis of the bow and having a raised crown region having a flattened top and a pair of side walls, each of the pair of the side walls joining with an attachment pad at a joining area to form a pair of the joining areas and a pair of the attachment pads, and each of the pair of attachment pads forming at least one adhesive retention groove on a lower surface, each of the attachment pads extending both outwardly from one of the pair of joining areas and from the median plane, and inwardly from one of the pair of joining areas and toward the median plane to form a pair of leg extensions extending inwardly from the joining areas, the crown the pair of side walls and the pair of leg extensions cooperating to form an interior cavity opening between the pair of leg extensions, the interior cavity forming an inside corner at each of the pair of joining areas between the pair of side walls and the pair of leg extensions to form a pair of the corner areas, the interior cavity forming an interior width between the pair of inside corners greater than a separation distance between the pair of leg extensions.

2. A roof bow as in claim 1, wherein the roof bow is symmetric in cross-section about the median plane which is oriented perpendicular to the raised crown region.

3. A roof bow as in claim 1 wherein the roof bow is formed from aluminum by extrusion.

4. A roof bow as in claim 1, wherein the roof panel of the trailer body includes a translucent portion to permit light to enter a cargo space of the trailer body and a plurality of the roof bow is bonded to the roof panel.

5. A roof bow as in claim 1, wherein the thickness of the raised crown region is different than the thickness of both of the pair of attachment pads.

6. A roof bow as in claim 1 wherein the thickness of the raised crown region is greater than the thickness of both of the pair of attachment pads.

7. A roof bow as in claim 1, wherein the raised crown region joins with the pair of side walls at a smoothened outside radius of about 0.312 inch.

8. A roof bow as in claim 1 used in an assembly of the trailer body with a plurality of the roof bow affixed to and extending between upper side rails of the trailer body and bonded to the roof panel by an adhesive.

9. A roof bow as in claim 1 wherein the roof bow is in a bowed shape when affixing to the trailer body.

* * * * *